(12) United States Patent
Aida et al.

(10) Patent No.: US 9,719,045 B2
(45) Date of Patent: Aug. 1, 2017

(54) GREASE COMPOSITION

(71) Applicant: KYODO YUSHI CO., LTD., Fujisawa-shi, Kanagawa (JP)

(72) Inventors: Ryo Aida, Suzuka (JP); Terasu Yoshinari, Chigasaki (JP); Junichi Imai, Fujisawa (JP)

(73) Assignee: KYODO YUSHI CO., LTD., Kanagawa (JP)

( * ) Notice: Subject to any disclaimer, the term of this patent is extended or adjusted under 35 U.S.C. 154(b) by 0 days.

(21) Appl. No.: 14/434,194

(22) PCT Filed: Oct. 25, 2013

(86) PCT No.: PCT/JP2013/078950
§ 371 (c)(1),
(2) Date: Apr. 8, 2015

(87) PCT Pub. No.: WO2014/065399
PCT Pub. Date: May 1, 2014

(65) Prior Publication Data
US 2015/0232784 A1  Aug. 20, 2015

(30) Foreign Application Priority Data

Oct. 26, 2012 (JP) ................................ 2012-236434

(51) Int. Cl.
*C10M 163/00* (2006.01)
*C10M 137/10* (2006.01)
(Continued)

(52) U.S. Cl.
CPC .................. *C10M 169/06* (2013.01)

(58) Field of Classification Search
CPC ...... C10M 2219/068; C10M 2223/045; C10M 2215/102
(Continued)

(56) References Cited

U.S. PATENT DOCUMENTS 5,301,923 A  4/1994  Asao et al.
5,462,684 A * 10/1995  Naka .................... C10M 169/02
                                                    508/485

(Continued)

FOREIGN PATENT DOCUMENTS

EP    1160308 A2   12/2001
EP    2135924 A1   12/2009
(Continued)

OTHER PUBLICATIONS

International Search Report (PCT/ISA/210) mailed on Dec. 17, 2013, by the Japanese Patent Office as the International Searching Authority for International Application No. PCT/JP2013/078950.
(Continued)

*Primary Examiner* — Vishal Vasisth
(74) *Attorney, Agent, or Firm* — Buchanan, Ingersoll & Rooney PC

(57) ABSTRACT

The invention provides a grease composition for rolling bearings of automotive electrical equipment or automotive auxiliaries, containing a base oil that includes as an essential component an alkyldiphenyl ether oil; a diurea thickener represented by formula (1); an anti-flaking additive including an organic sulfonate rust inhibitor and a load carrying additive; and an antioxidant. In the formula (1), $R^2$ is a bivalent aromatic hydrocarbon group having 6 to 15 carbon atoms; and one of $R^1$ or $R^3$ represents cyclohexyl group and the other represents cyclohexyl group, an alkyl group having 8 to 22 carbon atoms or an aromatic hydrocarbon group having 6 to 12 carbon atoms.

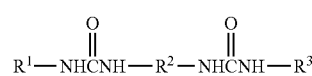

(1)

9 Claims, 1 Drawing Sheet

(51) Int. Cl.
*C10M 115/08* (2006.01)
*C10M 169/06* (2006.01)

(58) Field of Classification Search
USPC ........................................ 508/364, 370, 552
See application file for complete search history.

(56) References Cited

U.S. PATENT DOCUMENTS

| | | | |
|---|---|---|---|
| 5,728,659 | A | 3/1998 | Naka et al. |
| 2002/0159662 | A1 | 10/2002 | Hokao et al. |
| 2003/0027731 | A1 | 2/2003 | Kawamura et al. |
| 2010/0029521 | A1 | 2/2010 | Kondo et al. |
| 2012/0314985 | A1* | 12/2012 | Saita .................... C10M 169/06 384/490 |
| 2013/0345101 | A1 | 12/2013 | Imai et al. |

FOREIGN PATENT DOCUMENTS

| | | |
|---|---|---|
| EP | 2489721 A1 | 8/2012 |
| JP | 03-210394 A | 9/1991 |
| JP | 03-250094 A | 11/1991 |
| JP | 05-263091 A | 10/1993 |
| JP | 06-017079 A | 1/1994 |
| JP | 09-003466 A | 1/1997 |
| JP | 2002-130301 A | 5/2002 |
| JP | 2002-250351 A | 9/2002 |
| JP | 2004-108403 A | 4/2004 |
| JP | 2004-339245 A | 12/2004 |
| JP | 2005-048044 A | 2/2005 |
| WO | WO 2008/108489 A1 | 9/2008 |
| WO | WO 2012/124815 A1 | 9/2012 |

OTHER PUBLICATIONS

Written Opinion (PCT/ISA/237) mailed on Dec. 17, 2013, by the Japanese Patent Office as the International Searching Authority for International Application No. PCT/JP2013/078950.

Search Report issued by the European Patent Office in corresponding European Patent Application No. 13848677.4 on Apr. 28, 2016 (7 pages).

* cited by examiner

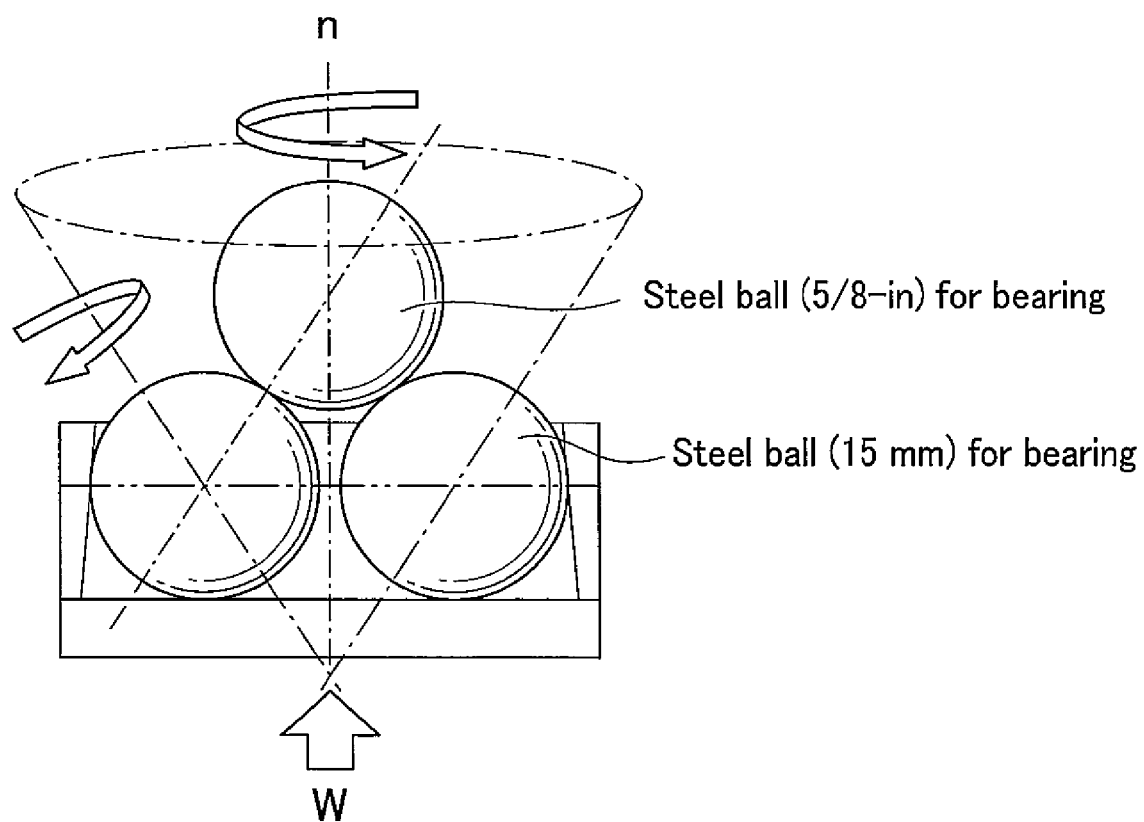

GREASE COMPOSITION

This application is a 371 of PCT/JP2013/078950, filed Oct. 25, 2013.

TECHNICAL FIELD

The present invention relates to a grease composition used for rolling bearings of the automotive electrical equipment or automotive auxiliaries.

BACKGROUND ART

To satisfy the demands on cars for a smaller size and lighter weight on one hand and a larger living space on the other hand, the reduction of space for the engine room has been required, which has led to the reduction in size and weight of the parts in the automotive electrical equipment and automotive auxiliaries, such as alternators, tension pulleys and the like. Also, in response to the demand for quietness, the engine room is closely sealed, so that greases are required to be resistant to high temperatures in consideration of the high-temperature operating environments.

In addition, the poly-V belts have been employed since the mid-1980s to meet the tendencies toward smaller-diameter pulleys and larger transmission torque, and to improve the belt durability. Concurrently, there has occurred a problem of unexpected early flaking associated with white change in structure on the rolling surface of the rolling bearings.

The bearings for use in the automotive electrical equipment or automotive auxiliaries have been thus required to have both long lubrication life and excellent resistance to flaking.

There are conventionally employed for rolling bearings lithium soap greases or diurea greases using as the base oil inexpensive mineral oil; lithium soap greases or diurea greases using as the base oil a synthetic hydrocarbon oil and an ether type synthetic oil and the like. In particular, the aromatic urea-containing diurea greases are frequently chosen in light of the durability under high temperatures.

However, those greases cannot satisfy the long bearing life under high temperatures because of the insufficient heat resistance of the employed base oils or thickeners and the poor flowability toward bearing portions to be lubricated with grease.

In order to inhibit a catalytic action on the metal surface newly exposed as a result of the wear, an anti-flaking additive, for example, an oxidizer for passivation such as nitrites or the like is added to the grease composition for oxidizing the metal surface to inhibit the catalytic action thereof, thereby preventing the generation of hydrogen that would be caused by decomposition of the lubricant. (JP (Hei) 3-210394 A and JP (Hei) 5-263091). Also, use of a phenyl ether type synthetic oil as the base oil for grease is proposed to prevent the generation of hydrogen caused by decomposition of the lubricant (JP (Hei) 3-250094 A). Further, it is proposed that azo compounds capable of absorbing hydrogen be added to the grease used for metal materials required to have tribological properties and for a variety of members, in particular, to the grease to be enclosed in the bearing located at a portion easily exposed to water (JP 2002-130301 A). In addition, a grease composition comprising a fluorinated polymer oil as the base oil, polytetrafluoroethylene as the thickener, and an electroconductive material is proposed for the purpose of extending the life of rolling bearings, without causing the hydrogen embrittlement-induced flaking even when water permeates through the bearing (JP 2002-250351 A). Also, there is proposed a grease composition comprising a poly α-olefin synthetic oil or diphenyl ether type synthetic oil, a urea-based thickener, at least one of an organic antimony compound or an organic molybdenum compound as the extreme-pressure agent, and zinc sulfonate (JP 2004-108403 A), which is designed to form a film on the surface of the rolling bearing to reduce the load applied to the rolling bearing in the tangential direction thereof under severe conditions including high temperatures, high speeds, heavy loads and the like.

However, any of the above-mentioned proposals are not sufficient measures to cope with the hydrogen embrittlement because those proposals are not intended to cope with the action after generation of hydrogen, in other words, to prevent the permeation of hydrogen into the inside of metal. Further, the addition of any nitrite, organic antimony compound or organic molybdenum compound is found to decrease the lubrication life at high temperatures.

SUMMARY OF INVENTION

Technical Problem

An object of the invention is to provide a grease composition for the rolling bearings used for automotive electrical equipment or automotive auxiliaries, which is capable of extending the bearing lubrication life even at elevated temperatures, and preventing hydrogen from penetrating into the inside of metals to exhibit excellent resistance to hydrogen embrittlement-induced flaking.

Solution to Problem

The inventors of the invention have successfully solved the problems of the bearing lubrication life at elevated temperatures and the anti-flaking life by choosing a proper base oil, thickener and additives. Namely, the invention provides a grease composition and a rolling bearing for automotive electrical equipment or automotive auxiliaries where the above-mentioned grease composition is enclosed as shown below.

1. A grease composition for rolling bearings of automotive electrical equipment or automotive auxiliaries, comprising;

a base oil that comprises as an essential component an alkyldiphenyl ether oil;

a thickener consisting of a diurea compound represented by the following formula (1):

(1)

wherein $R^2$ is a bivalent aromatic hydrocarbon group having 6 to 15 carbon atoms; and one of $R^1$ or $R^3$ represents cyclohexyl group and the other represents cyclohexyl group, an alkyl group having 8 to 22 carbon atoms or an aromatic hydrocarbon group having 6 to 12 carbon atoms;

as an anti-flaking additive an organic sulfonate rust inhibitor and a load carrying additive; and an antioxidant.

2. The grease composition for rolling bearings described in the above-mentioned item 1, wherein the thickener is the diurea compound of formula (1) in which one of $R^1$ or $R^3$ represents cyclohexyl group and the other represents an alkyl group having 8 to 22 carbon atoms, with the ratio of the cyclohexyl group in terms of the number of moles being 50 mol % or more when expressed by [{(the number of cyclohexyl groups)/(the number of cyclohexyl groups+the number of alkyl groups)}×100].

3. The grease composition for rolling bearings described in the above-mentioned item 1, wherein the thickener is the diurea compound of formula (1) in which one of $R^1$ or $R^3$ represents cyclohexyl group and the other represents an aromatic hydrocarbon group having 6 to 12 carbon atoms.

4. The grease composition for rolling bearings described in any one of the above-mentioned items 1 to 3, wherein the organic sulfonate rust inhibitor is represented by the following formula (2):

$$[R^4-SO_3]n^1M^1 \quad (2)$$

wherein $R^4$ is an alkyl group, alkenyl group, alkylnaphthyl group, dialkylnaphthyl group, alkylphenyl group or residual group of high-boiling petroleum fraction where the alkyl group or alkenyl group is a straight-chain or branched group having 2 to 22 carbon atoms; $M^1$ is an alkali metal, alkaline earth metal, zinc or ammonium ion; and $n^1$ is the valence number of $M^1$.

5. The grease composition for rolling bearings described in the above-mentioned item 4, wherein the organic sulfonate rust inhibitor is at least one selected from the group consisting of zinc sulfonate and calcium sulfonate.

6. The grease composition for rolling bearings described in any one of the above-mentioned items 1 to 5, wherein the load carrying additive is at least one selected from the group consisting of thiocarbamates, thiophosphates, naphthenates, carboxylates, and organic phosphate esters.

7. The grease composition for rolling bearings described in any one of the above-mentioned items 1 to 6, wherein the load carrying additive is at least one selected from the group consisting of zinc dialkyldithiocarbamates and zinc dialkyldithiophosphates.

8. The grease composition for rolling bearings described in any one of the above-mentioned items 1 to 7, wherein the antioxidant is an amine type antioxidant and/or a phenol type antioxidant.

9. The grease composition for rolling bearings described in the above-mentioned item 8, wherein the amine type antioxidant is an alkyldiphenylamine and the phenol type antioxidant is a hindered phenol.

10. A rolling bearing for automotive electrical equipment or automotive auxiliaries, wherein the grease composition described in any one of the above-mentioned items 1 to 9 is enclosed.

Advantageous Effects of Invention

The grease composition of the invention can exhibit a long lubrication life even at elevated temperatures and excellent anti-flaking properties.

BRIEF DESCRIPTION OF DRAWING

FIG. 1 is a schematic diagram showing the test using four rolling steel balls. In the FIGURE, n indicates 1500 rpm and W indicates 100 kg (4.1 GPa).

DESCRIPTION OF EMBODIMENTS

[Base Oil]

The base oil that can be used in the invention comprises as an essential component an alkyldiphenyl ether oil that exhibits a sufficient viscosity at high temperatures, less evaporation under high temperatures than ester type oils and poly α-olefin oils, excellent stability against oxidation, and less production of sludge. The alkyl group may be a branched or straight-chain group, and the latter may be preferable. The alkyl group may preferably have 10 to 20 carbon atoms, more preferably 12 to 14 carbon atoms. One kind of alkyldiphenyl ether oil may be used alone, or two or more kinds may be used in combination.

The content of the alkyldiphenyl ether oil in the base oil is not particularly limited, but may preferably be 60 mass % or more, and more preferably 100 mass %, based on the total mass of the base oil, to obtain a long life at high temperatures.

When the alkyldiphenyl ether oil is used in combination with other base oil components, for example, ester type synthetic oils such as diester oils and polyol ester oils, synthetic hydrocarbon oils such as poly α-olefin oils, silicone type synthetic oils, and fluorinated synthetic oils may be used. Especially, the ester type synthetic oils and the synthetic hydrocarbon oils are preferred, and in particular, dipentaerythritol ester oils and poly α-olefin oils are preferable.

There is no restriction on the kinematic viscosity of the base oil at 40° C., but the kinematic viscosity thereof may preferably be 30 to 300 mm²/s, more preferably 50 to 200 mm²/s and most preferably 50 to 150 mm²/s. When the kinematic viscosity of the base oil exceeds 300 mm²/s at 40° C., the low-temperature flowability will be unsatisfactory. When the kinematic viscosity of the base oil is less than 30 mm²/s at 40° C., the oil tends to easily evaporate and show poor heat resistance.

[Thickener]

Under the circumstances of high temperatures, the flowability of the grease in the bearing varies depending on the kind of thickener contained in the grease, which has a serious effect on the bearing lubrication life. For obtaining the long lubrication life, the grease is required to constantly retain on the portions to be lubricated, without softening or leakage. In light of this, the thickener that can be used in the invention is a diurea compound represented by the following formula (1):

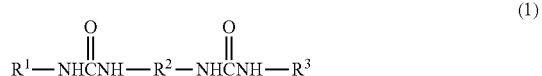

(1)

In the formula (1), $R^2$ is a bivalent aromatic hydrocarbon group having 6 to 15 carbon atoms; and one of $R^1$ or $R^3$ represents cyclohexyl group and the other represents cyclohexyl group, an alkyl group having 8 to 22 carbon atoms or an aromatic hydrocarbon group having 6 to 12 carbon atoms.

Representative examples of the group indicated by $R^2$ include the groups having the following structural formulas, and most preferable is a group where two phenyl groups are bonded to methylene group, as indicated in the center.

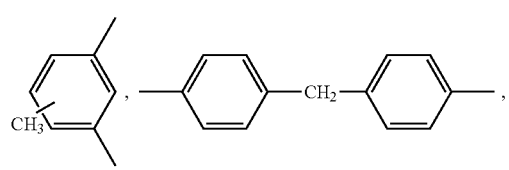

-continued

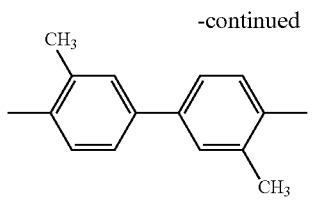

As the alkyl group having 8 to 22 carbon atoms, straight-chain alkyl groups having 8 to 18 carbon atoms are preferred, and straight-chain alkyl groups having 18 carbon atoms are most preferable. As the aromatic hydrocarbon group having 6 to 12 carbon atoms, those having seven carbon atoms are most preferable.

The diurea compounds of formula (1) where one of $R^1$ or $R^3$ represents cyclohexyl group and the other represents an alkyl group having 8 to 22 carbon atoms are preferable. The diurea compounds of formula (1) where one of $R^1$ or $R^3$ represents cyclohexyl group and the other represents an aromatic hydrocarbon group having 6 to 12 carbon atoms are also preferable.

When one of $R^1$ or $R^3$ represents cyclohexyl group and the other represents an alkyl group having 8 to 22 carbon atoms in formula (1), the ratio of the number of moles of the cyclohexyl group, which is expressed by [{(the number of cyclohexyl groups)/(the number of cyclohexyl groups+the number of alkyl groups)}×100] may preferably be 50 mol % or more. If the ratio of the cyclohexyl group in terms of the number of moles is less than 50%, the resultant grease tends to soften and increase the flowability, so that the grease easily leaks from the bearing, which will shorten the life. In light of this, the ratio of the cyclohexyl group in terms of the number of moles may preferably be 50% or more, more preferably 75% or more, and still more preferably 80% or more, and preferably 90% or less.

Particularly, in the case where one of $R^1$ or $R^3$ represents cyclohexyl group and the other represents an alkyl group having 8 to 22 carbon atoms in formula (1), the compound of formula (1) is preferable if $R^2$ is the group previously indicated in the center, $R^1$ is cyclohexyl group, and $R^3$ represents a straight-chain alkyl group having 18 carbon atoms, with the ratio of the cyclohexyl group being 75 to 90 mol %.

In the case where one of $R^1$ or $R^3$ represents cyclohexyl group and the other represents an aromatic hydrocarbon group having 6 to 12 carbon atoms in formula (1), the compound of formula (1) is most preferable if $R^2$ is the group previously indicated in the center, $R^1$ is cyclohexyl group, and $R^3$ represents an aromatic hydrocarbon group having 7 carbon atoms.

The content of the above-mentioned thickener may preferably be in the range of 10 to 25 mass %, and more preferably 13 to 20 mass %, based on the total mass of the grease composition according to the invention. With the content of less than 10 mass %, the resultant grease will be soft and may causes the problem of leakage, which cannot satisfy the lubrication life. On the other hand, when the content exceeds 25 mass %, the poor flowability will hinder the grease from entering into the portions to be lubricated, which may make the lubrication life unsatisfactory.

[Additives]

The grease composition of the invention is intended to extend the anti-flaking life by using as the anti-flaking additive an organic sulfonate rust inhibitor and a load carrying additive in combination.

As the organic sulfonate rust inhibitor, the compounds represented by the following formula (2) may advantageously be used.

$$[R^4\text{—}SO_3]n^1M^1 \qquad (2)$$

In the above formula, $R^4$ is an alkyl group, alkenyl group, alkylnaphthyl group, dialkylnaphthyl group, alkylphenyl group or residual group of high-boiling petroleum fraction. The above-mentioned alkyl group or alkenyl group is a straight-chain or branched group having 2 to 22 carbon atoms. Preferably, $R^4$ may be a dialkylnaphthyl group where an alkyl group has 6 to 18 carbon atoms, more preferably 8 to 12 carbon atoms, and most preferably nine carbon atoms.

$M^1$ represents an alkali metal, alkaline earth metal, zinc or ammonium ion. In particular, $M^1$ preferably represents an alkaline earth metal or zinc. Of the alkaline earth metals, calcium is preferable.

In the formula, $n^1$ is the valence number of $M^1$.

Preferably, the organic sulfonate rust inhibitor may be at least one salt selected from the group consisting of zinc salts and calcium salts. In particular, the organic sulfonate rust inhibitor may preferably be at least one selected from the group consisting of zinc dinonylnaphthalenesulfonate and calcium dinonylnaphthalenesulfonate.

The content of the organic sulfonate rust inhibitor may preferably be in the range of 0.1 to 10 mass %, and more preferably 0.2 to 5 mass %, based on the total mass of the grease composition according to the invention.

As the load carrying additive used in the invention, thiocarbamates such as zinc dialkyldithiocarbamate (ZnDTC) and the like, thiophosphates such as zinc dialkyldithiophosphate (ZnDTP) and the like, naphthenates such as zinc naphthenate, calcium naphthenate and the like, carboxylates such as zinc alkylcarboxylate and the like, organic phosphate esters such as trioctyl phosphate, triphenylphosphorothionate and the like may be used.

The load carrying additive may preferably be at least one selected from the group consisting of thiocarbamates, thiophosphates, naphthenates, carboxylates and organic phosphate esters, and more preferably selected from the group consisting of thiocarbamates and thiophosphates.

Desirably, the load carrying additive may be an alkali metal salt, alkaline earth metal salt, zinc salt or ammonium salt. Particularly, the zinc salt is preferable.

In particular, the load carrying additive may more preferably be zinc thiocarbamate or zinc thiophosphate, and most preferably zinc dialkyldithiocarbamate or zinc dialkyldithiophosphate.

The content of the load carrying additive may preferably be 0.1 to 10 mass %, and more preferably 0.2 to 5 mass %, based on the total mass of the grease composition according to the invention.

It is particularly preferable to use zinc dinonylnaphthalenesulfonate or calcium dinonylnaphthalenesulfonate as the organic sulfonate rust inhibitor, and ZnDTC or ZnDTP as the load carrying additive.

The total content of the organic sulfonate rust inhibitor and the load carrying additive may preferably be 0.2 to 20 mass %, and more preferably 0.5 to 10 mass %, based on the total mass of the grease composition according to the invention.

The grease composition of the invention further comprises an antioxidant. The antioxidant may include amine type antioxidants, phenol type antioxidants, and the like. In particular, it is recommendable to use the amine type antioxidant and the phenol type antioxidant in combination because the grease tends to deteriorate by oxidation under the circumstances of high temperatures. Examples of the amine type antioxidant include alkyldiphenylamine, N-n-butyl-p-aminophenol, α-naphthylamine, N-phenyl-α-naphthylamine, phenothiazine and the like. In particular, alkyldiphenylamine is preferred. The phenol type antioxidant may include hindered phenols and the like. In particular, hindered phenol is preferred. The total content of the antioxidant may preferably be 0.5 to 6 mass % based on the total mass of the grease composition according to the invention.

[Optional Additives]

The grease composition of the invention may further comprise other additives, such as other rust inhibitors than the above-mentioned organic sulfonate rust inhibitor, such as amine-based and carboxylate-based rust inhibitors; a metallic corrosion inhibitor such as benzotriazole or the like, an oiliness improver such as fatty acids, fatty acid esters, phosphates and the like; phosphorus-containing, sulfur-containing or organic metal-containing antiwear agent and extreme-pressure agent except the above-mentioned load carrying agent; and a solid lubricant such as oxidized metal salts, molybdenum disulfide or the like. The contents of those optional additives may generally be 0.5 to 5 mass % based on the total mass of the grease composition according to the invention.

Advantageously, however, the grease composition of the invention may not comprise any nitrite, organic antimony compound or organic molybdenum compound because such compounds contribute to deterioration of the lubrication life at high temperatures. For example, the nitrites include sodium nitrite, the organic antimony compounds include antimony dithiocarbamate and antimony dithiophosphate, and the organic molybdenum compounds include molybdenum dithiocarbamate and molybdenum dithiophosphate.

[Worked Penetration]

The worked penetration of the grease composition according to the invention may preferably be 200 to 300, and more preferably 220 to 280. When the worked penetration exceeds 300, the high-speed revolutions will often cause the problem of grease leakage, which may hinder the satisfactory lubrication life. When the worked penetration is less than 200, the poor flowability of the resultant grease may not satisfy the required lubrication life.

[Bearing]

The bearings where the grease composition of the invention is enclosed are rolling bearings for the automotive electrical equipment or automotive auxiliaries, such as alternators, electromagnetic clutches for car's air conditioners, intermediate pulleys, idler pulleys, tension pulleys and the like.

EXAMPLES

1. Preparation of Test Grease Compositions

Diphenylmethane diisocyanate (MDI) was reacted with an amine (cyclohexylamine (CHA), octylamine and p-toluidine in the predetermined amounts) in each base oil and the reaction mixture was diluted with the base oil to have a worked penetration of 280 (when determined according to JIS K2220), thereby obtaining a base grease. Some additives were added to the base grease. Thus, grease compositions were prepared in Examples and Comparative Examples.

The base oils and additives used in the preparation of the grease compositions are as follows.

(1) Base Oils

ADE: Alkyldiphenyl Ether Oil

Alkyl(C12-14) diphenyl ether oil: having a kinematic viscosity at 40° C. of 97 mm$^2$/s POE: Ester Oil Dipentaerythritol ester oil: having a kinematic viscosity at 40° C. of 76.9 mm$^2$/s PAO: Synthetic Hydrocarbon Oil Poly(α-olefin) oil: having a kinematic viscosity at 40° C. of 68.0 mm$^2$/s MO: Mineral Oil Naphthenic mineral oil: having a kinematic viscosity at 40° C. of 98 mm$^2$/s The base oil used in Examples 7 and 17 has a kinematic viscosity at 40° C. of 92.8 mm$^2$/S: and the base oil used in Examples 8 and 18 has a kinematic viscosity at 40° C. of 90.4 mm$^2$/s.

(2) Additives

<Anti-Flaking Additives>

(Organic Sulfonate Rust Inhibitors)

Ca Sulfonate

Ca salt of dinonylnaphthalene sulfonate

Zn Sulfonate

Zn salt of dinonylnaphthalene sulfonate (Load Carrying Additives)

ZnDTC

Zinc dialkyldithiocarbamate

ZnDTP

Zinc dialkyldithiophosphate

<Antioxidants>

Amine Type Antioxidant

Alkyldiphenylamine

Phenol Type Antioxidant

Hindered phenol

2. Test Methods (1) Bearing Lubrication Life Test (in Accordance with ASTM D3336)

This test was conducted by rotating the inner ring of a bearing to evaluate the bearing lubrication life at elevated temperatures. The rolling bearing was operated under the following conditions, and the lubrication life was regarded as time duration until the motor caused overcurrent or the bearing temperature increased by 15° C. The results are shown in Tables 1 to 4.

Bearing type: 6204 metal sealed bearing

Testing temperature: 180° C.

The number of revolutions: 10,000 rpm

Test loads: axial load 66.7 N radial load 66.7 N (2) Test Using Four Rolling Steel Balls Outline of the Test As shown in FIG. 1, three steel balls with a diameter of 15 mm designed for bearings were disposed in a cylindrical container with an inner diameter of 40 mm and a height of 14 mm, which was filled with about 20 g of a test grease composition. Another steel ball (⅝-in) for bearing was set to a tester so that the steel ball (⅝-in) was placed in contact with the top of the three steel balls. The steel ball (⅝-in) was driven to rotate for 4 hours for shakedown with the application of a load in a direction of W as shown in FIG. 1, and then hydrogen gas was introduced into the tester. The lower three balls revolved as each rotating on its axis. The ball was driven to rotate continuously until the flaking took place on the steel ball surfaces.

*The flaking occurs at a point between two balls applying the highest contact pressure to each other.

*The life was expressed as the total number of contact times of the upper ball with the lower balls counted when the flaking took place. These procedures were repeated at least five times to determine the L50 life (i.e., the number of contact times when 50% expired).

The results are shown in Tables 1 to 4.

Test Conditions

Steel balls for test: 15-mm-dia. steel balls and a ⅝-in steel ball for bearing

Load for test (W): 100 kgf (4.1 GPa)

Rotational speed (n): 1500 rpm

Feed rate of hydrogen gas: 15 ml/min.

Atmospheric pressure at test part: 0.96 atm. (because of vacuum extraction)

The repeated number of tests: 5 (at a minimum)

Evaluations

Bearing lubrication life test:

600 hours or more: oo (acceptable)

500-599 hours: o (acceptable)

less than 500 hours: x (unacceptable)

Test using four rolling steel balls:

$20 \times 10^6$ times or more: o (acceptable)

less than $20 \times 10^6$ times: x (unacceptable)

Overall Evaluations

Acceptable in both the bearing lubrication life test and the four rolling steel ball test: o (acceptable)

Unacceptable in either the bearing lubrication life test or the four rolling steel ball test: x (unacceptable)

TABLE 1

| | | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|
| Thickener (Molar ratio of isocyanate to amine) | Diisocyanate | MDI | 1 | 1 | 1 | 1 | 1 | 1 | 1 | 1 | 1 | 1 | 1 |
| | Monoamine | CHA | 1.5 | 2 | 1 | 1.5 | 1.5 | 1.5 | 1.5 | 1.5 | 0.8 | 1.5 | 1.5 |
| | | Octylamine | 0.5 | — | 1 | 0.5 | 0.5 | 0.5 | 0.5 | 0.5 | 1.2 | 0.5 | 0.5 |
| Base oil (Ratio by mass based on 100% base oil) | ADE | | 100 | 100 | 100 | 100 | 100 | 100 | 60 | 60 | 100 | 100 | 100 |
| | POE | | — | — | — | — | — | — | 40 | — | — | — | — |
| | PAO | | — | — | — | — | — | — | — | 40 | — | — | — |
| Rust inhibitor | Zn sulfonate | | 2.0 | 2.0 | 2.0 | 2.0 | — | — | 2.0 | 2.0 | 2.0 | 2.0 | 2.0 |
| | Ca sulfonate | | — | — | — | — | 2.0 | 2.0 | — | — | — | — | — |
| Load carrying additive | Zn DTP | | 1.0 | 1.0 | 1.0 | — | 1.0 | — | 1.0 | 1.0 | 1.0 | 1.0 | 1.0 |
| | Zn DTC | | — | — | — | 1.0 | — | 1.0 | — | — | — | — | — |
| Antioxidant | Amine type | | 2.0 | 2.0 | 2.0 | 2.0 | 2.0 | 2.0 | 2.0 | 2.0 | 2.0 | 2.0 | — |
| | Phenol Type | | 1.0 | 1.0 | 1.0 | 1.0 | 1.0 | 1.0 | 1.0 | 1.0 | 1.0 | — | 1.0 |
| Worked penetration | | | 280 | 280 | 280 | 280 | 280 | 280 | 280 | 280 | 280 | 280 | 280 |
| Seizure life | Life (hours) | | 600< | 600< | 600< | 600< | 600< | 600< | 600< | 600< | 505 | 560 | 532 |
| | Evaluation | | oo | oo | oo | oo | oo | oo | oo | oo | o | o | o |
| Test using four rolling steel balls | Number of contact times 1.50 ($\times 10^6$) | | 20< | 20< | 20< | 20< | 20< | 20< | 20< | 20< | 20< | 20< | 20< |
| | Evaluation | | o | o | o | o | o | o | o | o | o | o | o |
| Overall evaluation | | | o | o | o | o | o | o | o | o | o | o | o |

\* The contents of the rust inhibitor, load carrying additive are represented by mass % based on the total mass of each grease composition.

TABLE 2

| | | | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|---|
| Thickener (Molar ratio of isocyanate to amine) | Diisocyanate | MDI | 1 | 1 | 1 | 1 | 1 | 1 | 1 | 1 | 1 |
| | Monoamine | CHA | 1.4 | 1 | 1.4 | 1.4 | 1.4 | 1.4 | 1.4 | 1.4 | 1.4 |
| | | p-toluidine | 0.6 | 1 | 0.6 | 0.6 | 0.6 | 0.6 | 0.6 | 0.6 | 0.6 |
| Base oil (Ratio by mass based on 100% base oil) | ADE | | 100 | 100 | 100 | 100 | 100 | 60 | 60 | 100 | 100 |
| | POE | | — | — | — | — | — | 40 | — | — | — |
| | PAO | | — | — | — | — | — | — | 40 | — | — |
| Rust inhibitor | Zn sulfonate | | 2.0 | 2.0 | 2.0 | — | — | 2.0 | 2.0 | 2.0 | 2.0 |
| | Ca sufonate | | — | — | — | 2.0 | 2.0 | — | — | — | — |
| Load carrying additive | ZnDTP | | 1.0 | 1.0 | — | 1.0 | — | 1.0 | 1.0 | 1.0 | 1.0 |
| | ZnDTC | | — | — | 1.0 | — | 1.0 | — | — | — | — |
| Antioxidant | Amine type | | 2.0 | 2.0 | 2.0 | 2.0 | 2.0 | 2.0 | 2.0 | 2.0 | — |
| | Phenol Type | | 1.0 | 1.0 | 1.0 | 1.0 | 1.0 | 1.0 | 1.0 | — | 1.0 |
| Worked penetration | | | 280 | 280 | 280 | 280 | 280 | 280 | 280 | 280 | 280 |
| Seizure life | Life (hours) | | 600< | 600< | 600< | 600< | 600< | 600< | 600< | 600< | 598 |
| | Evaluation | | oo | oo | oo | oo | oo | oo | oo | oo | o |
| Test using four rolling steel balls | Number of contact times 1.50 ($\times 10^6$) | | 20< | 20< | 20< | 20< | 20< | 20< | 20< | 20< | 20< |
| | Evaluation | | o | o | o | o | o | o | o | o | o |
| Overall evaluation | | | o | o | o | o | o | o | o | o | o |

TABLE 3

| | | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|---|
| Thickener (Molar ratio of isocyanate to amine) | Diisocyanate | MDI | 1 | 1 | 1 | 1 | 1 | 1 | 1 | 1 | 1 |
| | Monoamine | CHA | 1.5 | 1.5 | — | 1.5 | 1.5 | 1.5 | 1.5 | 1.5 | 1.5 |
| | | Octylamine | 0.5 | 0.5 | 2 | 0.5 | 0.5 | 0.5 | 0.5 | 0.5 | 0.5 |

TABLE 3-continued

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|
| Base oil (Ratio by mass based on 100% base oil) | ADE | — | — | 100 | 100 | 100 | 100 | 100 | 100 | — |
|  | POE | 100 | — | — | — | — | — | — | — | — |
|  | PAO | — | 100 | — | — | — | — | — | — | — |
|  | MO | — | — | — | — | — | — | — | — | 100 |
| Rust inhibitor | Zn sulfonate | 2.0 | 2.0 | 2.0 | 2.0 | — | — | — | 2.0 | 2.0 |
|  | Ca sufonate | — | — | — | — | 2.0 | — | — | — | — |
| Load carrying additive | ZnDTP | 1.0 | 1.0 | 1.0 | — | — | 2.0 | — | 1.0 | 1.0 |
|  | ZnDTC | — | — | — | — | — | — | 2.0 | — | — |
| Antioxidant | Amine type | 2.0 | 2.0 | 2.0 | 2.0 | 2.0 | 2.0 | 2.0 | — | 2.0 |
|  | Phenol Type | 1.0 | 1.0 | 1.0 | 1.0 | 1.0 | 1.0 | 1.0 | — | 1.0 |
| Worked penetration |  | 280 | 280 | 280 | 280 | 280 | 280 | 280 | 280 | 280 |
| Seizure life | Life (hours) | 448 | 205 | 333 | 600< | 600< | 600< | 600< | 400 | 192 |
|  | Evaluation | x | x | x | ∘∘ | ∘∘ | ∘∘ | ∘∘ | x | x |
| Test using four rolling steel balls | Number of contact times 1.50 (×10$^6$) | 20< | 20< | 20< | 9.8 | 10.8 | 10.2 | 10.5 | 20< | 20< |
|  | Evaluation | ∘ | ∘ | ∘ | x | x | x | x | ∘ | ∘ |
| Overall evaluation |  | x | x | x | x | x | x | x | x | x |

TABLE 4

|  |  |  | Comp. Ex. 10 | Comp. Ex. 11 | Comp. Ex. 12 | Comp. Ex. 13 | Comp. Ex. 14 | Comp. Ex. 15 | Comp. Ex. 16 |
|---|---|---|---|---|---|---|---|---|---|
| Thickener (Molar ratio of isocyanate to amine) | Diisocyanate | MDI | 1 | 1 | 1 | 1 | 1 | 1 | 1 |
|  | Monoamine | CHA | 0.6 | 0.6 | 0.6 | 0.6 | 0.6 | 0.6 | 0.6 |
|  |  | p-toluidine | 1.4 | 1.4 | 1.4 | 1.4 | 1.4 | 1.4 | 1.4 |
| Base oil (Ratio by mass based on 100% base oil) | ADE |  | — | — | 100 | 100 | 100 | 100 | 100 |
|  | POE |  | 100 | — | — | — | — | — | — |
|  | PAO |  | — | 100 | — | — | — | — | — |
| Rust inhibitor | Zn sulfonate |  | 2.0 | 2.0 | 2.0 | — | — | — | 2.0 |
|  | Ca sufonate |  | — | — | — | 2.0 | — | — | — |
| Load carrying additive | ZnDTP |  | 1.0 | 1.0 | — | — | 2.0 | — | — |
|  | ZnDTC |  | — | — | — | — | — | 2.0 | — |
| Antioxidant | Amine type |  | 2.0 | 2.0 | 2.0 | 2.0 | 2.0 | 2.0 | — |
|  | Phenol Type |  | 1.0 | 1.0 | 1.0 | 1.0 | 1.0 | 1.0 | — |
| Worked penetration |  |  | 280 | 280 | 280 | 280 | 280 | 280 | 280 |
| Seizure life | Life (hours) |  | 495 | 252 | 600< | 600< | 600< | 600< | 461 |
|  | Evaluation |  | x | x | ∘∘ | ∘∘ | ∘∘ | ∘∘ | x |
| Test using four rolling steel balls | Number of contact times 1.50 (×10$^6$) |  | 20< | 20< | 7.2 | 8.4 | 7.9 | 8.1 | 20< |
|  | Evaluation |  | ∘ | ∘ | x | x | x | x | ∘ |
| Overall evaluation |  |  | x | x | x | x | x | x | x |

The grease compositions of Examples 1 to 20 can exhibit long bearing lubrication life under elevated temperatures, and at the same time excellent resistance to flaking caused by hydrogen embrittlement.

The grease compositions of Comparative Examples 1, 2 and 9, which are the same as the grease composition of Example 1 except that the ADE is replaced by POE, PAO and MO respectively are all inferior in the seizure life.

The grease composition of Comparative Example 3 where the diurea thickener does not comprise any cyclohexyl group is inferior in the seizure life.

The grease compositions of Comparative Examples 4, 5, 12 and 13 containing no load carrying additive, and the grease compositions of Comparative Examples 6, 7, 14 and 15 containing no organic sulfonate rust inhibitor are inferior in the resistance to flaking caused by hydrogen embrittlement in any case.

The grease compositions of Comparative Examples 8 and 16 containing no antioxidant are inferior in the seizure life.

The invention claimed is:
1. A grease composition, comprising;
a base oil that comprises as an essential component an alkyldiphenyl ether oil;
a thickener consisting of a diurea compound represented by formula (1):

(1)

wherein $R^2$ is a bivalent aromatic hydrocarbon group having 6 to 15 carbon atoms; and one of $R^1$ or $R^3$ represents cyclohexyl group and the other represents an alkyl group having 18 carbon atoms, with the ratio of the cyclohexyl group in terms of the number of moles being 75 mol % to 90 mol % when expressed by [{(the number of cyclohexyl groups) / (the number of cyclohexyl groups + the number of alkyl groups)} ×100];
as an anti-flaking additive an organic sulfonate rust inhibitor and a load carrying additive; and
an antioxidant,
wherein the organic sulfonate rust inhibitor is at least one selected from the group consisting of zinc sulfonate and calcium sulfonate, and is contained in an amount of 0.1 to 10% by mass, the load carrying additive is at least one selected from the group consisting of zinc dialkyldithiocarbamates and zinc dialkyldithiophosphates, and is contained in an amount of 0.1 to 10% by mass, the antioxidant is at least one selected from the group consisting of an amine type antioxidant and a phenol type antioxidant, and is contained in an amount of 0.5 to 6% by mass, and all mass percentages are based on the total mass of the crease composition.

2. The grease composition of claim 1, wherein the amine type antioxidant is an alkyldiphenylamine and the phenol type antioxidant is a hindered phenol.

3. A rolling bearing for automotive electrical equipment or automotive auxiliaries, wherein the grease composition of claim 1 is enclosed.

4. The grease composition of claim 1, wherein the content of the alkyldiphenyl ether oil in the base oil is 60 mass % or more based on the total mass of the base oil.

5. The grease composition of claim 1, wherein the content of the thickener is 10 to 25 mass % based on the total mass of the grease composition.

6. The grease composition of claim 1, wherein the total content of the organic sulfonate rust inhibitor and the load carrying additive is 0.2 to 20 mass % based on the total mass of the grease composition.

7. The grease composition of claim 1, wherein the kinematic viscosity of the base oil at 40° C. is 30 to 300 mm$^2$/s.

8. The grease composition of claim 1, wherein the base oil is alkyldiphenyl ether oil alone or in combination with ester synthetic oils or synthetic hydrocarbon oils.

9. The grease composition of claim 1, wherein the base oil is alkyldiphenyl ether oil alone or in combination with polyol ester oils or poly alpha-olefin oils.

* * * * *